July 28, 1959

C. A. SPURGIN 2,896,730

ROLLING CRUST BREAKER

Filed Aug. 15, 1956

INVENTOR.
C. A. Spurgin
BY Arthur H. Sturges.
Attorney

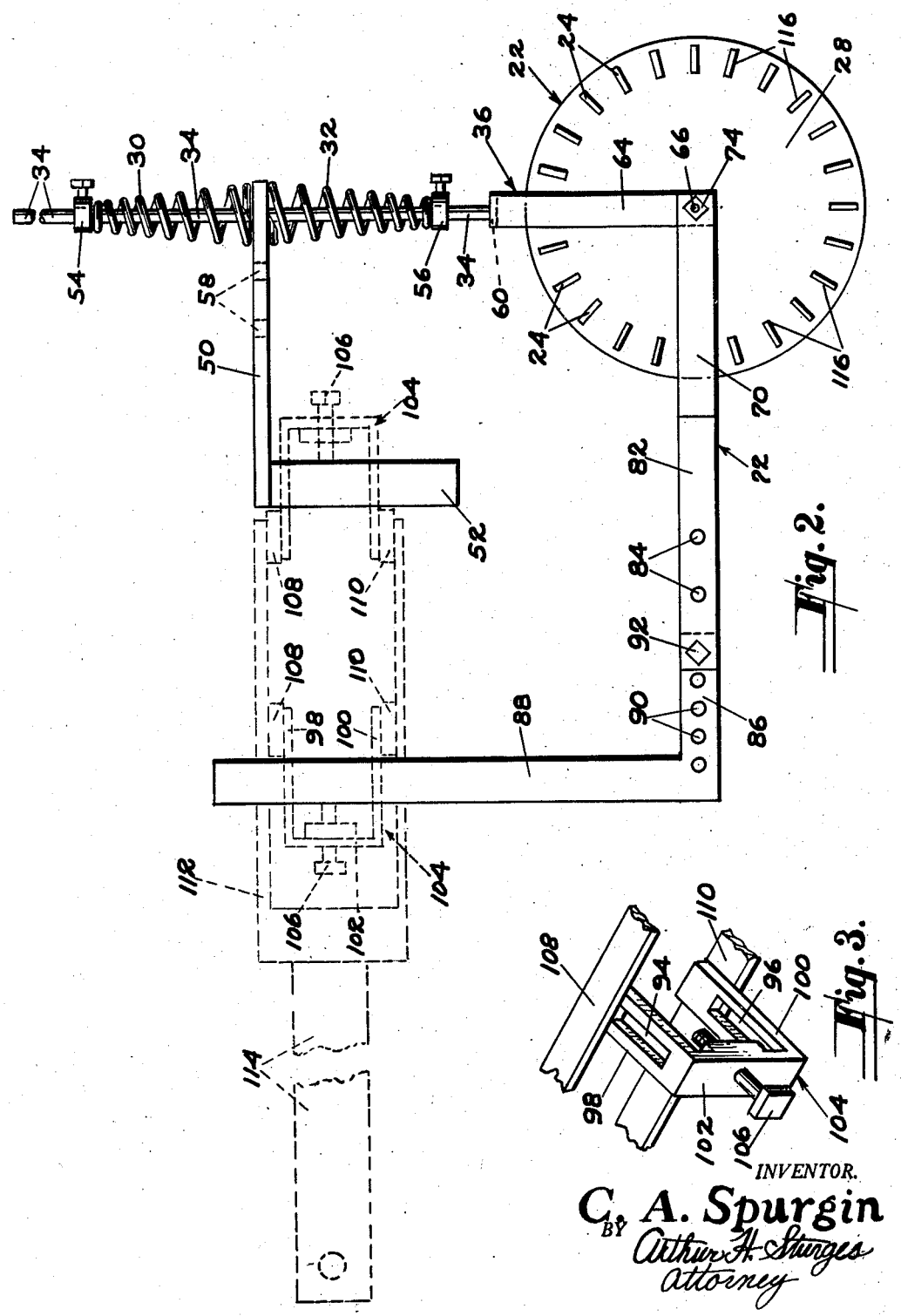

July 28, 1959  C. A. SPURGIN  2,896,730
ROLLING CRUST BREAKER
Filed Aug. 15, 1956  3 Sheets-Sheet 3
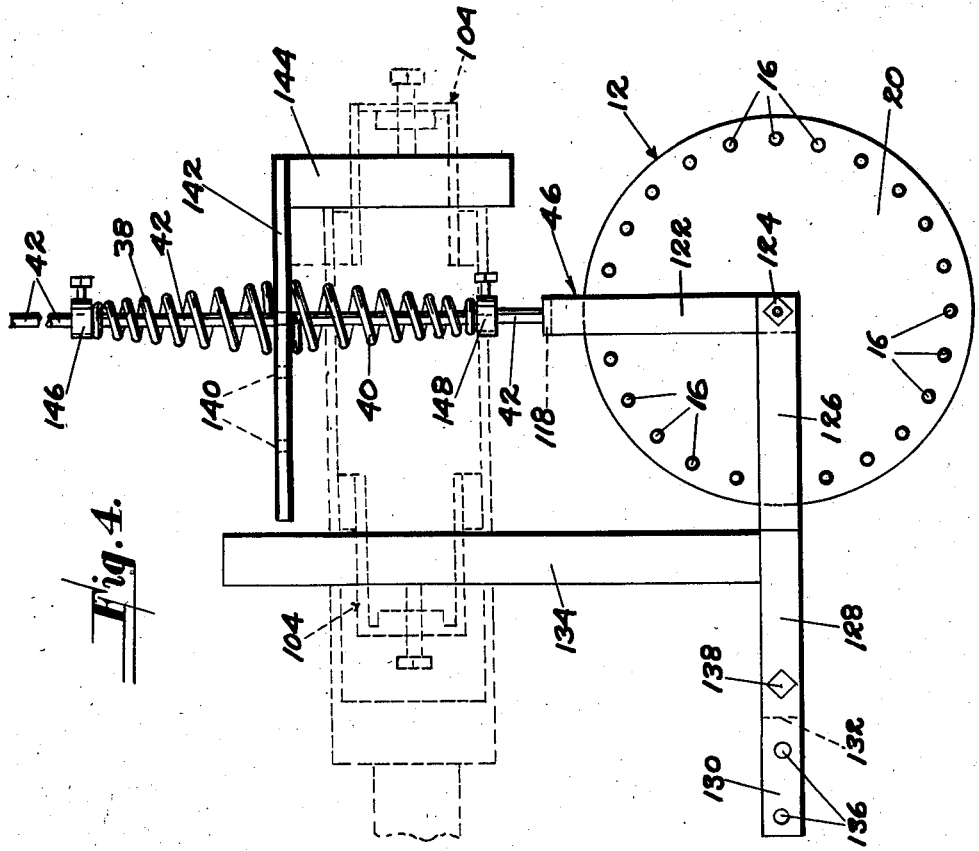
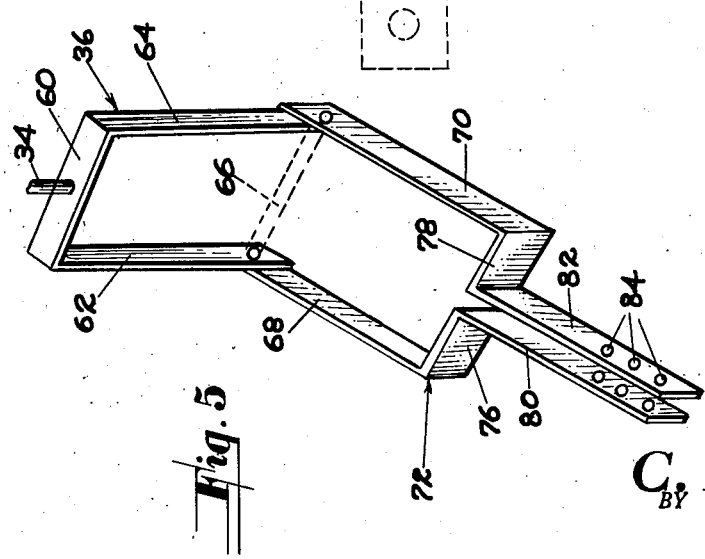
INVENTOR.
C. A. Spurgin
BY Arthur H. Sturges
Attorney United States Patent Office 2,896,730
Patented July 28, 1959

2,896,730
ROLLING CRUST BREAKER
Clarence A. Spurgin, Alliance, Nebr.
Application August 15, 1956, Serial No. 604,218
4 Claims. (Cl. 172—158)

This invention relates to agriculture and particularly cultivation of small plants, and in particular a machine for breaking the crust of the ground with one type of unit operating upon rows of plants, and another in the soil between rows of plants and with the device leaving a fine mulch which conserves valuable soil moisture.

The purpose of this invention is to provide an implement for breaking the crust of soil which penetrates only slightly into the soil whereby only a thin film of the soil at the top is subjected to winds and valuable moisture is retained in the soil below.

After spring planting spring rains cause the ground to run together leaving a fine silt or crust on top of the soil, and unless this seal is broken and the ground roughened the wind blows the silt often cutting off newly emerged plants and the water is retained on top of the ground where it is rapidly evaporated by winds. Furthermore the young plants are often unable to push through the crust. Conventional tools used for breaking this crust, such as finger weeders, rotary hoes, spike harrows, and the like dig into the soil to a depth of from one to six inches leaving this area exposed to the winds and much valuable moisture is lost. These implements also leave the soil too rough wherein in a splashing rain plants are mudded in, and in some instances it is necessary to replant entire crops. The implements also cause injury to young plants.

With this thought in mind this invention contemplates a machine having spaced pairs of discs with radially positioned rods extended between the discs providing crust breaking wheels positioned to travel upon the rows of plants, and another wheel having radially positioned bars extended between a pair of discs and positioned to travel between rows of plants with suitable framework for supporting the wheels.

The object of this invention is, therefore, to provide a machine for breaking the crust of soil in fields of small plants which leaves a rough mulch between the rows of plants.

Another object of the invention is to provide a machine for breaking crust at the top of the ground in which the elements operate with a pressing and rolling action whereby damage to plants is reduced to a minimum.

Another important object of the invention is to provide a crust breaking attachment having rods and slats extended between discs in which the cultivating elements are resiliently mounted.

It is yet another object of the invention to provide a crust breaking device which provides a fine mulch over the rows of plants whereby the plants are substantially flush with the soil and the possibility of the plants being mudded in by rains is reduced to a minimum.

A further object of the invention is to provide a crust breaking device in which one type of element is used on the rows of plants and a different type is used between the rows, and in which means is provided for adjusting the elevation of the elements.

A still further object is to provide a crust breaking device for roughening the ground particularly around small plants in which the device is of a simple and economical construction.

With these and other objects and advantages in view the invention embodies a pair of wheels having rods carried by spaced discs rotatably mounted in yokes resiliently held in arms extended from posts adjustably secured in clamps suspended from a cultivator rack by tool bars and positioned to roll upon rows of plants, and a wheel having slats extended between discs also carried by yokes and clamps from the tool bars and positioned to travel between rows of plants.

Other features and advantages of the invention will appear from the following description taken in connection with the drawings, wherein:

Figure 2 is a longitudinal section taken on line 2—2 of Figure 1 showing a unit for breaking crust of soil between rows of plants, with the unit on the far side omitted, and with the cultivator tool bars shown in broken lines.

Figure 3 is a perspective view showing a conventional clamp, of one design, for securing cultivator tools to tool bars.

Figure 4 is a longitudinal section taken on line 4—4 of Figure 1, illustrating one of the units for breaking the crust of soil in the rows of plants, also with the cultivator tool bars shown in broken lines.

Figure 5 is a perspective view of one of the frames used for supporting the units.

Figure 1:
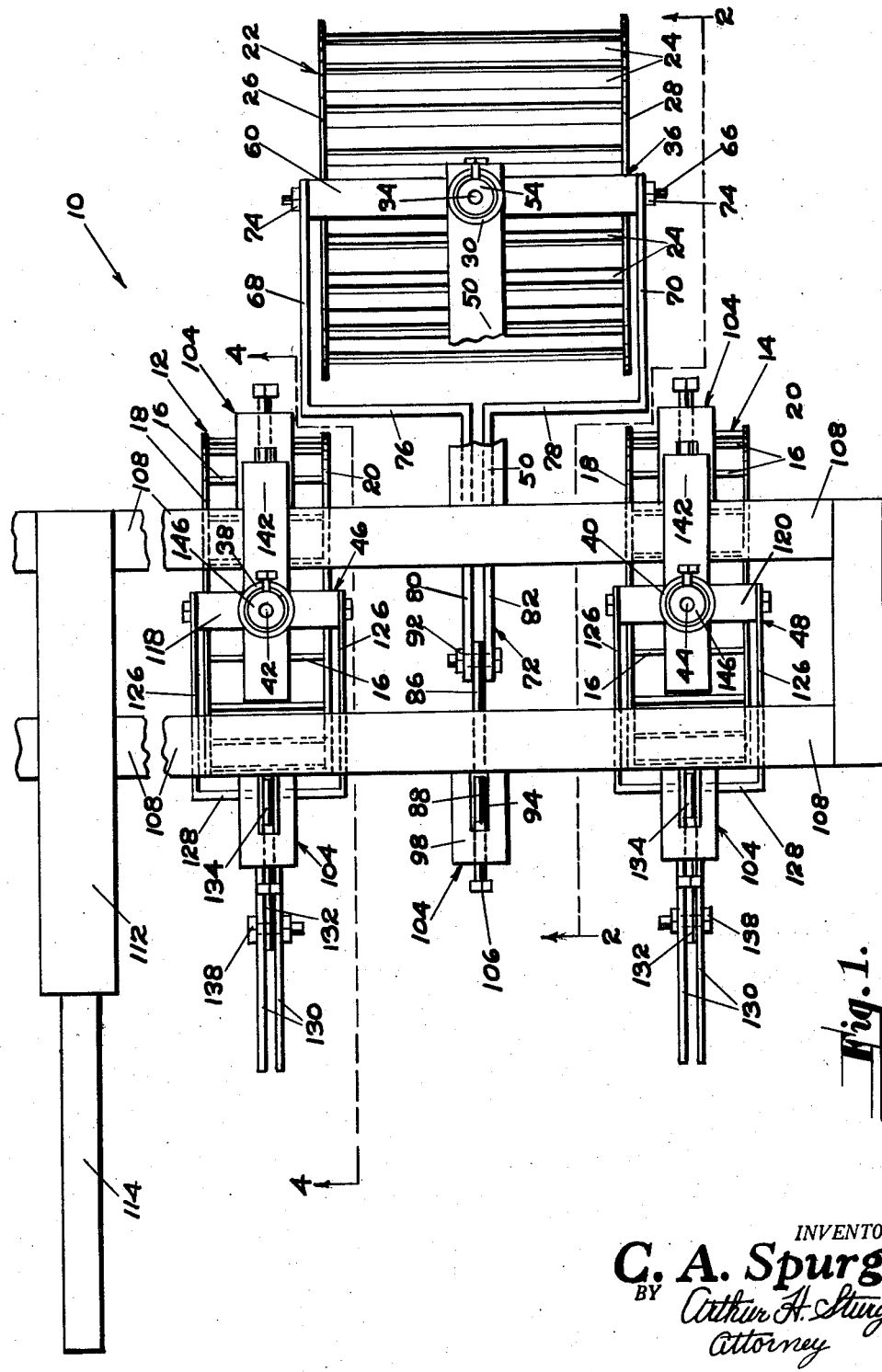
Figure 1 is a plan view of a crust breaking attachment showing the wheels and mounting elements extended from one side of a cultivator rack, parts of the tool bars thereof being broken away.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings and in the following specification, the same reference characters are used to designate the same parts and elements throughout, and in which the numeral 10 refers to the invention in its entirety, numerals 12 and 14 indicating wheels positioned to travel along rows of plants and having radially disposed rods 16 extended between discs 18 and 20, numeral 22 a wheel having radially disposed bars or slats 24 extended between discs 26 and 28 and positioned to travel between rows of plants, numerals 30 and 32 springs extended around a post 34 positioned on a yoke 36 in which the wheel 22 is mounted, and numerals 38 and 40 springs positioned around posts 42 and 44 extended upwardly from yokes 46 and 48, respectively, in which the wheels 12 and 14 are mounted.

The springs 30 and 32 are positioned on opposite sides of an arm 50 extending from the upper end of an upright 52 and the upper and lower ends of the springs are adjustably held in position on the post 34 with set collars 54 and 56. The bar 50 is provided with spaced openings 58 through which the post 34 may extend thereby providing means for adjusting the location of the post in relation to the tool bars of the cultivator. The post 34 is secured, such as by welding, to a horizontal bar 60 of the yoke 36 and vertically disposed arms 62 and 64 of the yoke extend downwardly from ends of the bar 60. The lower ends of the arms 62 and 64 which are mounted upon an axle 66 are secured to arms 68 and 70 of a horizontal frame 72, the axle 66 also extending through the arms 68 and 70. The axle is secured in position with nuts 74 threaded on the ends thereof.

The extended ends of the arms 68 and 70 are provided with inwardly extended sections 76 and 78 from which bars 80 and 82 extend, and the bars 80 and 82 are provided with spaced openings or bolt holes 84 by which the frame is adjustably connected to the lower end 86 of an upright 88. The end 86 is also provided with spaced openings or bolt holes 90, and with the holes in registering relation the parts are retained in position by a pivot bolt 92.

The uprights 52 and 88 extend through slots 94 and 96 of arms 98 and 100 which extend from vertically disposed bars 102 of clamps 104 and the uprights are secured in adjusted positions in the arms of the clamps by set screws 106. The clamps are mounted on tool bars 108 and 110 which extend from the cultivator rack 112, such as by welding, and the cultivator rack is provided with a tractor attaching tongue 114. The device may be drawn by a tractor, although it is preferred to mount the crust breaker directly upon a tractor.

The bars 24 are secured by welding in openings 116 in the discs 26 and 28, and with the discs rotatably mounted on the axle 66 the wheel is free to rotate in the yoke and frame. The wheel is resiliently urged downwardly by the spring 32, and movement thereof is restricted by the spring 30, thereby providing a floating movement so that the wheel follows the surface of the soil. With the positions of the springs controlled by the set collars the wheel is adapted to be adjusted to operate at any suitable elevation.

The wheels 12 and 14 are mounted similar to the wheel 22 with the posts 42 and 44 secured, such as by welding, to horizontally disposed bars 118 and 120 of the yokes 46 and 48, and arms 122 extended from ends of the bars are mounted on ends of axles 124 on which the ends of arms 126 of horizontally disposed frames 128 are also mounted. The frames 128 are similar to the frame 72, shown in Figure 5, and bars 130 at the ends thereof, are adjustably secured to ends 132 of uprights 134. The bars 130 and ends 132 are provided with spaced openings 136 and the parts are secured in adjusted positions by pivot bolts 138. The posts 42 and 44 are positioned in spaced openings 140 in arms 142 on the upper ends of uprights 144, and the arms 142 are positioned between the springs 38 and 40. The springs are retained in adjusted positions by set collars 146 and 148 whereby the wheels 12 and 14 are urged downwardly by the springs 40 and held with floating actions between the springs 38 and 40. The uprights 134 and 144 are secured by the clamps, such as the clamps shown in Figure 3, to the tool bars of the cultivator rack, as shown in Figure 4.

With the parts assembled as illustrated and described one of the wheels may be used independently, or the two wheels 12 and 14 may be used without the wheel 22, or just the wheel 22 may be used between the rows, or the three wheels may be used in combination, as shown in Figure 1. The wheels are freely rotatable on the axles, the wheels 12 and 14 also being provided with sleeves which are secured between the discs, and as the device moves along rows of plants the crust of the soil is broken with a rolling downwardly pressing action whereby a thin mulch is provided and the device is operated over the plants without damage to the plants.

The rods and bars are set inwardly from the peripheries of the discs about ¾" so that the edges of the discs cut into the soil on the sides of the rows and between the rows to reduce the pressure on the rods and bars and also to leave a rough mulch between the rows.

It is preferred to use ⅛" rods and ⅛" x ¾" bars or straps.

From the foregoing specification it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which the invention relates when once placed on the market.

It is thought that persons skilled in the art to which the invention appertains will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent is:

1. In a soil crust breaker, the combination which comprises a pair of row engaging wheels and a wheel positioned to travel between the rows, said row engaging wheels including spaced discs with round rods extended between the discs and spaced inwardly from the edges thereof, and said wheel positioned to travel between rows including spaced discs with slats extended between the discs and spaced inwardly from the edge thereof, vertically disposed yokes in which the wheels are mounted, posts extended upwardly from the yokes, arms carried by uprights and having openings through which the posts extend, springs on the posts and positioned on opposite sides of the arms, and horizontally disposed frames positioned to support lower ends of the yokes and having uprights extended upwardly therefrom, said uprights of the arms and frames being formed to be secured to tool bars of a cultivator rack by clamps whereby the wheels having the round rods therein are positioned to be centered on rows of plants with the wheels having the slats therein positioned between the rows of plants.

2. In a soil breaker, the combination which comprises a pair of row engaging wheels and a wheel to travel between the rows, said row engaging wheels including spaced discs with radially disposed round rods extended between the discs and spaced inwardly from the peripheries of the discs, and said wheel positioned to travel between rows including spaced discs with radially disposed slats extended between the discs and spaced inwardly from the peripheries thereof, vertically disposed yokes in which the wheels are positioned, horizontally disposed frames extended from lower ends of the yokes, axles extended through ends of the frames, and lower ends of the yokes, for rotatably mounting the wheels in the device, first uprights having horizontally disposed lower ends extended upwardly from the frames, posts extended upwardly from the yokes, second uprights having arms extended therefrom positioned with the posts extended through said arms, spring on the posts and positioned above and below said arms, and set collars on said posts for adjusting the tension of the springs, said uprights being adapted to be adjustably mounted in clamps on tool bars extended from a cultivator rack.

3. In a soil crust breaker, the combination which comprises a plurality of horizontally disposed yokes having uprights extended upwardly therefrom, the uprights being formed to be secured by clamps to tool bars of a cultivator rack, spaced discs with radially disposed circumferentially spaced round rods extended therebetween rotatably mounted in two of the yokes and positioned to straddle rows of plants, spaced discs having radially disposed circumferentially spaced slats extended therebetween rotatably mounted in one of the yokes and positioned to travel between rows of plants, the distance between the discs in which the slats are positioned being greater than the distance between the discs in which the round rods are positioned, vertically disposed yokes extended upwardly from the horizontally disposed yokes and having posts extended upwardly therefrom, the posts of the yokes extending through openings in horizontally disposed arms secured to uprights mounted by clamps on tool bars of the cultivator rack, equalizing springs extended around the posts and positioned on opposite sides of the arms for returning the arms to neutral positions, and set collars secured on the posts and positioned to engage ends of the springs for adjusting the positions of the yokes, discs, rods and bars whereby the round rods work the soil around the plants and the slats scrape the weeds from the areas between the plants.

4. In a soil crust breaker, the combination which comprises a plurality of horizontally disposed yokes having uprights extended upwardly therefrom, the uprights being formed to be secured by clamps to tool bars of a cultivator rack, spaced discs with radially disposed circumferentially spaced round rods extended therebetween rotatably mounted in at least two of the yokes and positioned to straddle rows of plants, spaced discs having radially disposed circumferentially spaced slats extended therebetween rotatably mounted in at least one of the yokes and positioned to travel between rows of plants, vertically disposed yokes extended upwardly from the horizontally disposed yokes and having posts extended upwardly therefrom, means for mounting the posts on the tool bars of the cultivator rack, equalizing springs extended around the posts and positioned on opposite sides of mounting means of the posts on the tool bars of the cultivator rack, and means on the posts for adjusting the tension of the springs for adjusting the positions of the yokes, discs, rods, and bars whereby the round rods work the soil around the plants and the slats scrape weeds from areas between the plants.

References Cited in the file of this patent

UNITED STATES PATENTS

| | | |
|---|---|---|
| 308,306 | Davis et al. | Nov. 18, 1884 |
| 1,291,129 | Price | Jan. 14, 1919 |
| 2,252,593 | Bruene | Aug. 12, 1941 |
| 2,569,464 | Edwards et al. | Oct. 2, 1951 |
| 2,727,448 | Taylor | Dec. 20, 1955 |